May 2, 1961 O. J. CONVERSE 2,982,525
FLOUR AND SHORTENING MIXER
Filed Sept. 4, 1959 2 Sheets-Sheet 1

INVENTOR.
OLIVER J. CONVERSE
BY *Hiram J. Sturges*
   *Agent*

*INVENTOR.*
OLIVER J. CONVERSE

United States Patent Office 2,982,525
Patented May 2, 1961

2,982,525

FLOUR AND SHORTENING MIXER

Oliver J. Converse, 1841 High St., Lincoln, Nebr.

Filed Sept. 4, 1959, Ser. No. 838,257

1 Claim. (Cl. 259—107)

This invention relates to kitchen utensils used for mixing products, and in particular a bowl having an outwardly flared upper end with vertically spaced horizontally disposed fingers extended inwardly from one side, and a vertically disposed shaft having a hand crank on the upper end rotatably mouned in the bowl and having vertically spaced prongs extended therefrom and positioned to mesh with the fingers of the bowl for cutting one product into another as the shaft is rotated, and thereby thoroughly mixing products in the bowl.

The purpose of this invention is to provide a utensil for mixing shortening, such as butter, lard, or the like, with flour whereby the shortening is thoroughly distributed throughout the flour.

In preparing food products for baking and the like shortening is worked into flour by hand and by this method it is sometimes difficult to break up the shortening so that it is even distributed throughout the flour. With this thought in mind this invention contemplates a mixer having a comb of vertically spaced horizontally disposed fingers positioned in a side of a bowl with meshing horizontally disposed prongs carried by a vertically disposed shaft with the shaft rotatably mounted in the bowl and provided with a hand crank at the upper end by which the shaft is rotated.

The object of this invention is to provide a manually actuated mixing bowl wherein one product is forced through another by prongs meshing with fingers in which all portions of both products are broken up continuously as the mixer is in operation.

Another object of the invention is to provide a mixer for working shortening into flour in which moving parts extend to substantial engagement with stationary parts so that it is impossible for portions of products being mixed to lodge in inaccessible pockets.

Another important object of the invention is to provide a manually actuated rotary mixer wherein moving parts substantially scrape stationary parts to prevent portions of products sticking to walls of the mixer to facilitate cleaning.

It is yet another object of the invention to provide a rotary mixer having a wall with an outwardly flared upper end to prevent overflowing whereby greater quantities of products may be mixed in relatively small containers.

A further object of the invention is to provide a manually actuated mixer having vertically spaced prongs meshing with similarly spaced fingers in which the positions of the fingers are adjustable laterally and wherein the fingers are readily removable as a unit, for cleaning.

A still further object of the invention is to provide a rotary mixer having prongs meshing with fingers and wherein the lowermost of the prongs scrapes the bottom surface of the mixer wherein the mixer is of simple and economical construction.

With these and other objects and advantages in view the invention embodies an open container having a boss depending from the lower end and an outwardly flared upper end, a stand including diverging legs upon which the container is mounted, a comb having vertically spaced fingers extended from a head extended through openings in the wall of the container, and a shaft having vertically spaced prongs extended therefrom and a hand crank on the upper end positioned with the lower end rotatably held in the boss at the lower end of the container and with the prongs meshing with the fingers of the comb.

Other features and advantages of the invention will appear from the following description taken in connection with the drawings, wherein.

Figure 1:
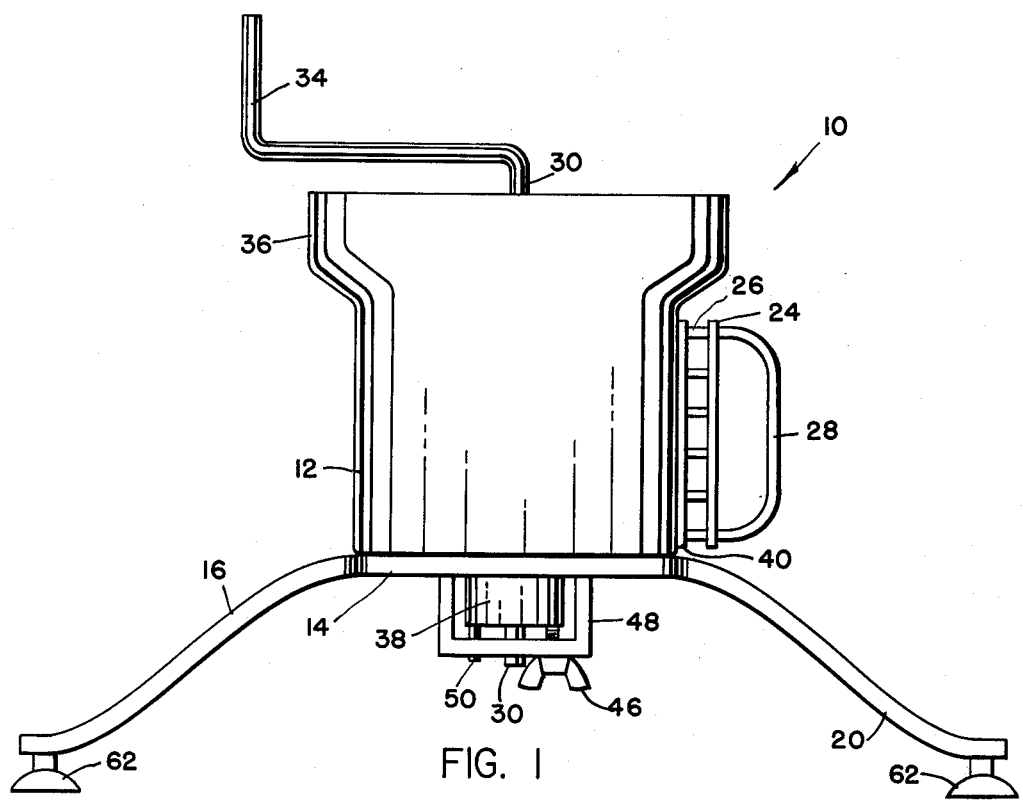
Fig. 1 is a side elevational view of the mixer showing the mixer with the finger carrying comb partially withdrawn.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise without in any manner departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a container or bowl, numeral 14 a stand having legs 16 and 18 at one end and 20 and 22 at the other, numeral 24 a comb having fingers 26 and a handle 28 and numeral 30 a shaft having prongs 32 on the lower portion and a crank 34 on the upper end.

The bowl 12 is provided with an outwardly flared upper end 36, a boss 38 depending from the lower end, and a boss 40 with openings 42 therethrough on one side. The boss 38 is provided with a threaded opening 44 for receiving a thumb screw 46 extended through a U-shaped bracket 48 positioned over the boss. The boss 38 is also provided with a locating pin 50 that extends through an opening 52 in the bracket whereby the bracket is positioned so that the thumb screw is in registering relation with the opening 44. The boss 38 is also provided with a key 54 that is positioned in a notch 56 in the stand 14 to prevent the bowl turning on the stand. The bracket 48 is provided with an opening 58 that is positioned to receive the lower end of the shaft 30 which extends through an opening 60 in the boss 38.

The lower ends of the legs of the stand 14 are provided with vacuum cups 62 by which the mixer may be retained in position on a table top or the like. It will be understood, however, that the mixer may be held by other suitable means.

Figure 3:
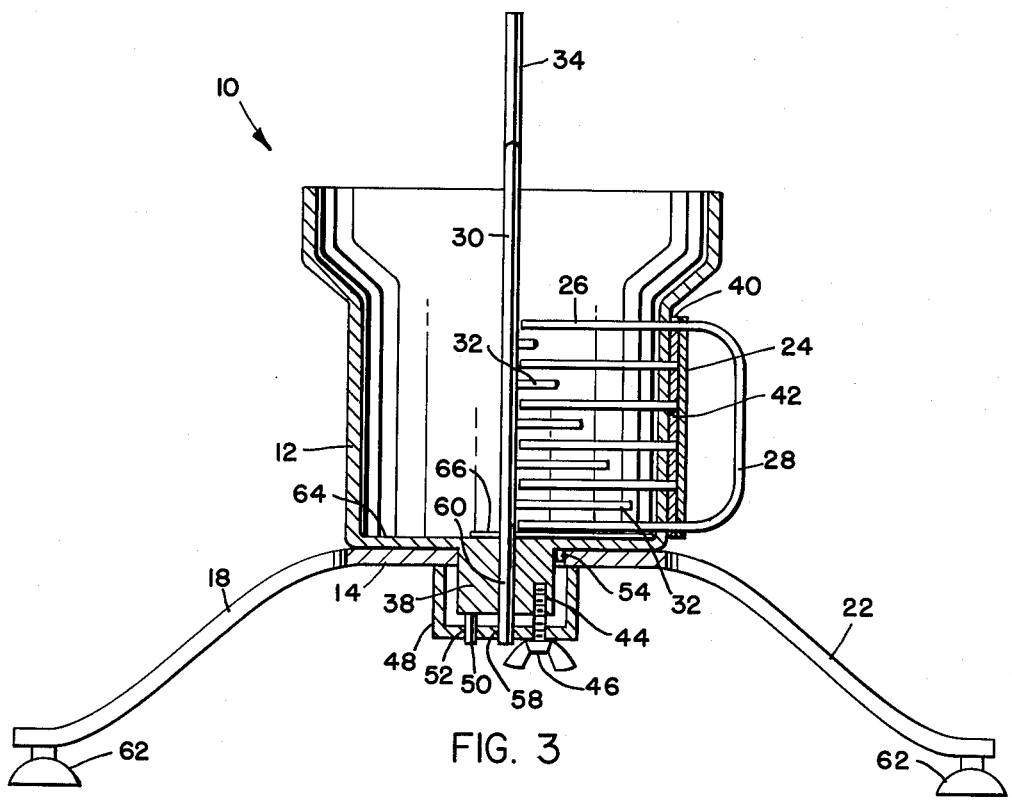
Figure 3 is a vertical section through the mixer taken on line 3—3 of Figure 2 showing the comb with the fingers in the operative position.
Figure 4:
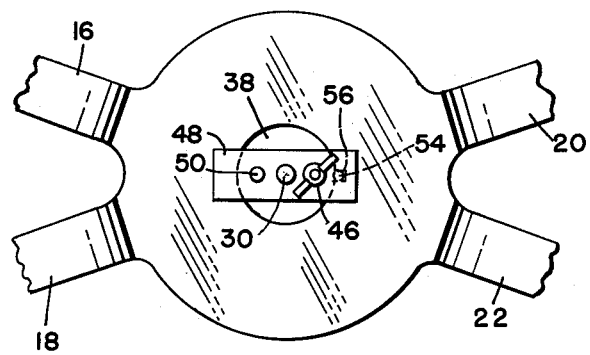
Figure 4 is a view looking upwardly toward the under surface of the stand of the mixer showing a thumb screw for retaining the mixer on the stand and also showing a positioning pin for locating the mixer on the stand, the legs of the stand being broken away.

The openings 42 in the boss 40 also extend through the wall of the bowl and the fingers 26 are positioned in the openings through the boss and bowl with the parts in operative positions. It will be noted in Figure 3 that the inner ends of the fingers substantially engage the surface of the shaft 30, making it substantially impossible for products to stick to the shaft. The lowermost prong scrapes the upper surface of the bottom 64 of the bowl and the end 66 of said lowermost prong extends beyond the shaft to provide a bearing.

Figure 2:
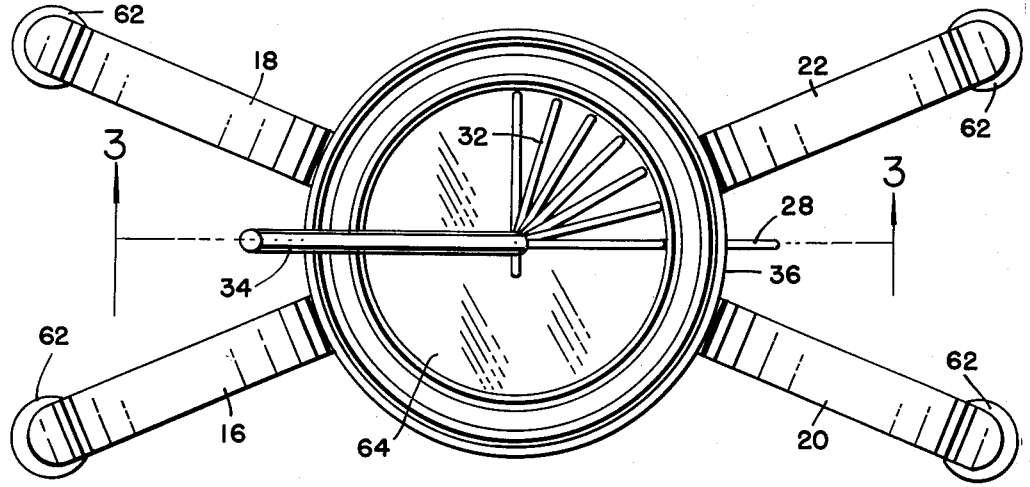
Figure 2 is a plan view of the mixer.

The prongs 32 extended from the shaft 30 are preferably positioned in a quadrant, as shown in Figure 2, although it will be understood that they may be extended over any suitable area.

*Operation*

With the parts assembled as illustrated and described flour and shortening are placed in the bowl and upon rotation of the shaft by the crank 34 the shortening is squeezed by the prongs between the fingers whereby the shortening is cut or worked into the flour and with continued turning of the shaft the flour and shortening are thoroughly worked together so that the finished product contains flour with shortening evenly distributed therethrough.

The mixer may also be used for other products, and the bowl may be of any other shape in cross section or plan.

From the foregoing specification it will become apparent that the invention disclosed will adequately accomplish the functions for which it has been designed and in an economical manner, and that its simplicity, accuracy, and ease of operation are such as to provide a relatively inexpensive device considering what it will accomplish and that it will find an important place in the art to which the invention appertains when once placed on the market.

It is thought that persons skilled in the art to which the invention relates will be able to obtain a clear understanding of the invention after considering the description in connection with the drawings.

Changes in shape, size, and arrangement of details and parts such as come within the purview of the invention claimed may be resorted to in actual practice, if desired.

Having now described the invention that which is claimed to be new and desired to be procured by Letters Patent, is:

In a kitchen utensil, the combination which comprises a cylindrical bowl having an outwardly flared upper end, a vertically disposed row of spaced openings in one side, and a boss depending from the lower end, a stand having pairs of radially disposed legs extended from opposite sides and upon which said bowl is positioned, the stand having an opening therein and through which the boss extends, a bracket depending from the stand and in which the boss is positioned, a locating pin extended from the lower end of the boss and through an opening in the bracket, a thumb screw extended through the bracket and threaded into the lower end of the boss for retaining the bowl on the stand, vacuum cups carried by the extended ends of the legs, said boss of the bowl having a vertically disposed centrally positioned opening extended therethrough, a shaft having a crank on the upper end positioned with the lower end rotatably mounted in the vertically disposed opening of the boss, said bracket having a centrally disposed opening therein and said opening of the bracket being aligned with the centrally positioned opening of the boss, the lower end of the shaft being positioned in the centrally positioned opening of the bracket, a comb having a back with vertically spaced fingers extended from one side and a handle extended from the opposite side positioned with the fingers extended through the vertically spaced openings of the bowl, the ends of said fingers positioned in the bowl being spaced from the surface of the shaft, and vertically spaced prongs carried by the shaft and positioned to mesh with the fingers of the comb projected through the wall of the bowl for mixing products in the bowl.

References Cited in the file of this patent
UNITED STATES PATENTS

| Number | Name | Date |
|---|---|---|
| 12,127 | Gore | Jan. 2, 1855 |
| 31,554 | Mickey | Feb. 26, 1861 |
| 34,968 | Kelling | Apr. 15, 1862 |
| 735,353 | Eifert | Aug. 4, 1903 |
| 935,377 | Long | Sept. 28, 1909 |
| 946,610 | Malmquist et al. | Jan. 18, 1910 |
| 1,191,170 | Free | July 18, 1916 |
| 1,681,076 | Wahl | Aug. 14, 1928 |
| 2,711,765 | Pecoraro | June 28, 1955 |